April 28, 1942. G. E. INMAN Re. 22,083

GASEOUS AND VAPOR ELECTRIC DISCHARGE DEVICE

Original Filed Sept. 11, 1934 2 Sheets-Sheet 1

Inventor:
George E. Inman,
by Harry E. Dunham
His Attorney.

April 28, 1942. G. E. INMAN Re. 22,083

GASEOUS AND VAPOR ELECTRIC DISCHARGE DEVICE

Original Filed Sept. 11, 1934 2 Sheets-Sheet 2

Inventor:
George E. Inman.
by Harry E. Dunham
His Attorney.

Reissued Apr. 28, 1942 Re. 22,083

UNITED STATES PATENT OFFICE 22,083

GASEOUS AND VAPOR ELECTRIC DISCHARGE DEVICE

George E. Inman, East Cleveland, Ohio, assignor to General Electric Company, a corporation of New York Original No. 2,103,034, dated December 21, 1937, Serial No. 743,504, September 11, 1934. Application for reissue October 19, 1939, Serial No. 300,240

21 Claims. (Cl. 176—122)

My invention relates to gaseous or vapor electric discharge devices containing some working substance providing an ionizable atmosphere during operation, and particularly to discharge devices of the so-called "positive column" type, exemplified in gas lamps such as argon or neon lamps, and in metal vapor lamps such as sodium lamps. Very usually, sodium or other metal vapor lamps include in their working substance a small amount of easily ionized gas like neon, argon, etc. (whose partial pressure in the lamp is around 1 or 2 to 7 m. m.), to assist in starting the sodium or other vapor discharge: i. e., the lamp starts as a gas lamp, and as it heats up operates more and more as a sodium vapor lamp. My invention is especially concerned with the starting of positive column devices, and is very useful in reducing or minimizing the starting voltages of such devices, and in starting relatively long tubular devices. The invention facilitates the starting of devices with discharge gaps so long that they might otherwise require excessive starting voltages, and also allows of improving the economy of operation of such devices after starting. It is especially adaptable and advantageous for low-pressure positive column glow discharge devices having one or more "hot" or "separately heated" electron-emissive-"thermionic"-electrodes,—as distinguished from so-called "cold" electrodes, heated only by the discharge.

Heretofore, discharge devices of this character having relatively long discharge gaps have employed electrodes each resistively heated, with a very small voltage drop between its heating-current leads (usually about 2 volts) for the sake of uniform emission from the electrode surface. Usually, two leads were run through the stem or end of the lamp bulb for each electrode. For starting such devices, a high voltage across the discharge gap between the coacting electrodes had to be relied on, so that it was generally impossible to start them on an ordinary A. C. lighting circuit of about 110 to 120 volts. To provide the low potential (2 volt) drop for heating the electrodes, as well as the high voltage for the discharge between them, special external arrangements were necessary. As, moreover, the voltage required at starting very much exceeded the subsequent normal operating voltage of the device, voltage-controlling means had to be provided to permit high starting voltage and assure suitably reduced operating voltage.

I have found that by using different electrodes from those heretofore used in such positive column discharge devices, and changing various associated features, the starting of such devices can be facilitated, and a longer lamp started on a given voltage; their starting voltages reduced; their economy in normal operation improved; their construction and accessories simplified and cheapened; and various other advantages secured. Instead of electrodes with only a 2 volt drop between their heating-current leads, I employ one or more electrodes with heating means taking at starting a voltage considerably over 2 volts or the like, and, indeed, in excess of the ionization potential of the atmosphere in the envelope of the device at or during starting. Across the heating-current circuit of this electrode-heating means, I cause or permit a preliminary, local discharge,—in parallel with said heating means or a part thereof,—thus ionizing enough of the atmosphere in the device to facilitate starting of the main discharge. To minimize or prevent undesirable persistence of such local discharge, suitable control over the voltage across the heating circuit is provided, to reduce it sufficiently to mitigate or terminate the local discharge. This does not necessarily require reducing the heating-circuit voltage actually below the ionization potential of the atmosphere in the device, after the main discharge has started, but only reducing it to a point where the local discharge gap is too great for such reduced heating-circuit voltage to maintain a local discharge of any magnitude.

A very simple arrangement consists of an indirectly heated uni-potential type of electrode having its electron-emissive portion or surface connected in parallel with a heating resistance (external or internal) of suitably high value, and also having a current lead to the resistance (or an associated part) suitably exposed close to the emissive surface, to serve as anode for a local discharge across the gap between such emissive surface and anode. With the parallel connection indicated, an automatic voltage control for the main discharge may readily control the voltage across the heating resistance circuit, so as to reduce it nearly to or below the ionization potential above referred to. The voltage control may consist of a ballast resistance (preferably of positive temperature-resistance coefficient, like the tungsten filament of an incandescent lamp) in series with the device, or of a high-reactance transformer, or of a reactor, etc.

My invention also aims at improving the efficiency of low pressure positive column or cathodic vapor discharge devices characterized by a diffuse glow discharge, that generally appears to fill the whole envelope, as in sodium vapor lamps, by uniformly heating their envelopes,—even in cases when the starting features above set forth are not employed.

Various other features and advantages of my invention will appear from the following description of species thereof, and from the drawings.

In the drawings, Fig. 1 is a side view of one form of positive column discharge device embodying my invention, with a wiring diagram of its electrical connections.

Figs. 5, 6, 7, and 8 are similar views of still other forms.

Figure 1:
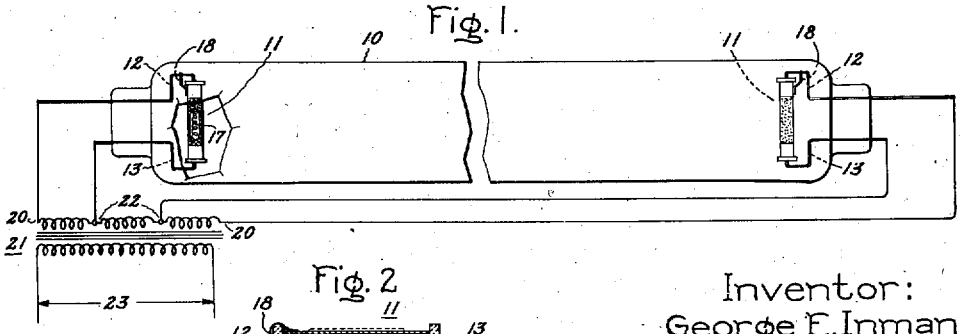

Fig. 1 shows a device well adapted for use as a low pressure positive column glow discharge metal vapor lamp (e. g., a sodium lamp) containing easily ionizable starting gas like neon, argon, or the like, and suitable for alternating current. It comprises a fairly long tubular (glass) envelope or bulb 10 with electrodes 11, 11 in its opposite ends, and a pair of current leads 12, 13 to each electrode, both (in the present instance) sealed through the corresponding end walls. The electrodes 11, 11 are shown as of unipotential, indirectly heated, "thermionic" type, and as externally emissive and extending diametrally of the envelope and parallel with one another,—although these latter details are broadly unessential. While the details of electrode construction are likewise broadly unessential, yet for the sake of clearness the electrodes 11, 11 may be briefly described (see Fig. 2) as each comprising an electron-emissive portion consisting of a metal (nickel) base tube 14 with an external surface or coating 15 of emissive material (like barium oxide); shouldered insulative refractory (lava) plugs 16, 16 in the ends of the tube, centrally bored for passage of the current leads 12, 13; and a finely coiled (tungsten) heating wire or filament 17 welded to the leads and extending axially in the tube 14. The tube 14 is shown connected to the lead 12 by a metal (nickel) strip 18, so that the emissive portion or surface at 15 has virtually the electrical potential of this lead 12 and of the end of the filamentary heating resistance 17 that is connected to said lead 12. Hence the lead 12 requires no insulation within the envelope 10. The other lead 13 is freely exposed in the envelope 10 outside the electrode 11,—at least over a limited area, and preferably where it is near(est) the emissive surface 15,—to serve as anode for a local discharge between it and the electrode 11.

As here shown, the leads 12, 12 serve as the current leads of the main discharge circuit to the gap between the electrodes 11, 11, and each pair of leads 12, 13 serve as the leads of a heating circuit including the corresponding resistance 17. The leads 12, 12 are shown connected to the secondary terminals 20, 20 of a transformer 21 as a source of discharge current at suitably high voltage for starting, and the leads 13, 13 are shown connected to intermediate taps 22, 22 on the transformer secondary. The transformer primary is shown connected in a suitable A. C. supply circuit 23 of 110 to 120 volts,—or of any other suitable voltage. The transformer 21 itself affords ballast reactance to control the discharge voltage and current of the circuit 12, 12 and between the electrodes 11, 11, and the heating voltages (and currents) of the circuit(s) 12, 13 and through the resistance(s) 17, so that special additional ballast resistance for the purpose is not ordinarily needed.

The showing of the transformer 21 and the connection of the leads 12, 12 and 13, 13 to its primary terminals 20, 20 and taps 22, 22 illustrate the provision of high starting voltage for the main discharge, and the fact that the heating circuit voltages combined need not necessarily equal (or even approach) the main discharge circuit voltage in order to produce preliminary local discharges between one or both electrodes 11, 11 and the lead or leads 13, 13. Quite obviously, the necessary voltages and the currents in the main discharge and heating circuits might be produced in a great variety of other ways well known to electrical engineers. The connections also illustrate the fact that the voltages for the heating circuits 12, 13 need not be the same, and that, if desired an ionizing starting voltage might be used for only one such heating circuit, and only one local preliminary discharge thus produced. In this case, the resistances 17, 17 would probably, of course, have to be of unequal values.

In operation, starting cold, the turning on of current causes heating of the electrodes 11, 11 to electron-emissive temperatures by the currents in their heating circuits 12, 13, 12, 13. With suitable values of the heating resistances 17, 17, the heating circuit voltages at starting readily exceed the ionizing potential of argon (15.7 volts) or neon (21.5 volts), so that with the electron-emission from the surfaces 15, 15, local discharges readily start across the relatively short gaps between the electrodes 11, 11 as cathodes and their leads 13, 13 as anodes, thus ionizing gas in the envelope 10. The main discharge between the electrodes 11, 11 then starts easily, owing to the relatively large amount of conductive gas thus provided for it, and the higher voltage between the electrodes 11, 11 than across each heating circuit 12, 13. But as the main discharge increases and the total current through the leads 12, 12 correspondingly increases, the ballast reactance embodied in the transformer 21 takes a larger proportion of the available voltage. Hence the voltage and the local discharge between each electrode 11 and lead 13 decreases, until the voltage across each circuit 12, 13 sufficiently approaches (or falls below) the ionization potential of the atmosphere in the envelope 10, and the local discharge practically ceases. Ordinarily, this occurs before sodium vapor becomes very noticeable in the luminosity of the discharge, because the discharge must heat up the envelope 10 considerably before enough sodium vaporizes to have any importance in the discharge.

For various reasons, the voltage drop along a heater resistance or filament 17 should not be allowed to become excessive, during either starting or operation. In the first place, the higher this voltage (above the ionization voltage), the greater the consumption of energy in the relatively inefficient discharge between electrode 11 and lead 13. In the second place, a serious discharge or arc along the heater filament 17 itself is to be avoided. As the operating voltage is considerably lower than the starting voltage, no difficulty in operation is to be apprehended if the starting voltage, on the filaments is kept within proper limits.

Besides the direct advantages of the easier starting made possible by the preliminary local discharges at the electrodes 11, 11, the lower starting voltage thus permitted reduces the amount of ballast needed.

A positive column lamp of very simple construction can be made to start on a low voltage, without any special transformer arrangement or the like by interconnecting or merging its electrode-heating circuits, including resistances 17, 17, in series with one another and in parallel with the main discharge gap,—provided, of course the main discharge gap is not so long that the heating resistances would be under excessive voltages at starting when so connected. This series connection of the heating resistances may be either outside or inside the lamp envelope 10.

Figure 3:
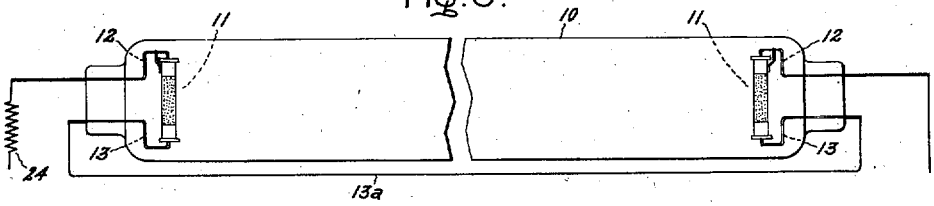
Fig. 3 is a similar view of a like device with different and somewhat simpler circuit features.

Fig. 3 shows such a simplification, with the external heating circuit leads 13, 13 of the two electrodes 11, 11 interconnected or merged in one lead 13*a*. A ballast resistance 24 is in series both with the main discharge gap 11, 11 and with the heating circuit from 12 through 13, 13*a* and 13 to 12, so as to control the voltages in both. Obviously, the voltages on the two heating resistances 17, 17 are together equal to the main discharge voltage. The operation of the device is substantially the same as that of Fig. 1 device.

Figure 5:
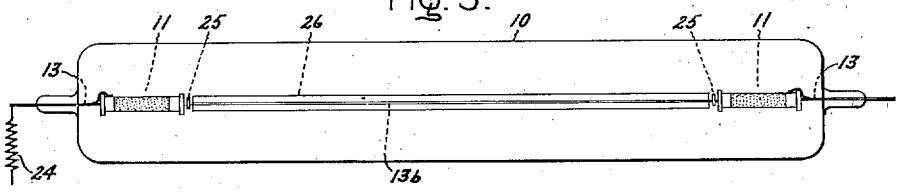
Figure 4:
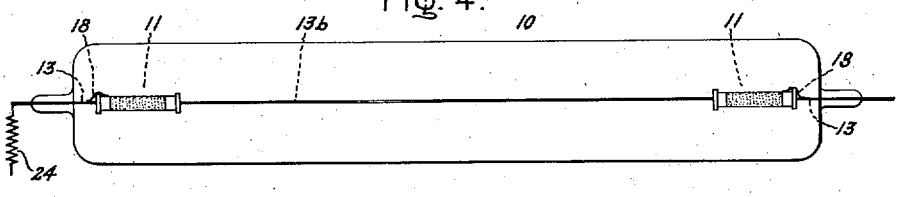
Fig. 4 is a side view of a simpler form of discharge device.

Fig. 4 shows a simplification of the device itself by using an internal (molybdenum) lead 13*b* extending right along through the main discharge gap between the electrodes 11, 11, instead of an external lead as in Fig. 3. In this lamp, the electrodes 11, 11 are arranged axially in the ends of the envelope 10, and the lead 13*b* also extends axially of the envelope. Experience has shown that such an arrangement is practically satisfactory when the operating and starting voltages are not excessive according to the criteria above set forth,—i. e., when the electrode gap 11—11 is not too long,—and when the surface area of the lead 13*b* is quite small. The lead 13*b* may preferably be provided with projecting anodes or starting "points" 25, 25, formed by short cross pieces of wire (tungsten or molybdenum) welded to the lead, adjacent each electrode 11, as shown in Fig. 5. Such anode projections or enlargements 25 not only serve as definite starting points, but also bear the brunt of the local starting discharges. By their limited size they provide sufficient anode areas for the local discharges at starting, while limiting the discharges in volume at starting and afterward.

In order to minimize any persistence of local discharge between an electrode 11 and the corresponding heating current lead 13 or 13*b*, I prefer to limit or minimize the anode area for such discharge,—inasmuch as only a small local discharge current is required to facilitate starting. For this purpose, all but a small area of the heating current lead wire may be insulatively covered. Accordingly, Fig. 5 shows an insulative tube 26 (of glass, or even of more refractory material like alumina) around all of the lead 13*b* between the electrodes 11, 11, excepting very short places adjacent the latter, where the lead is exposed for starting, and the points 25, 25 are attached, if used.

Figure 6:
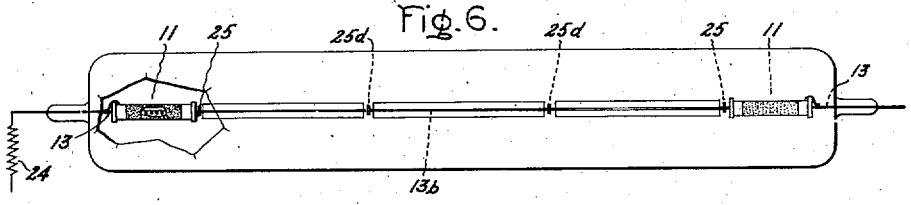

Fig. 6 shows a device like Fig. 5 with two additional intermediate exposed starting points 25*d*, 25*d*, on the head 13*b*, between the starting points 25, 25 to assist in starting a long main discharge.

While the "set-up" of Fig. 1 is more complicated than those of Figs. 3–6, it permits a higher starting voltage and a longer main discharge gap, because proper starting voltages are provided for the electrode heaters 17, 17 and the local starting discharges (between electrodes 11, 11 and leads 13, 13), regardless of the main gap length 11—11 and the main discharge voltage. However, similar advantages can be secured without the complications of Fig. 1, by suitable resistance of or in the lead serially interconnecting the electrode heaters 17, 17.

Figure 7:
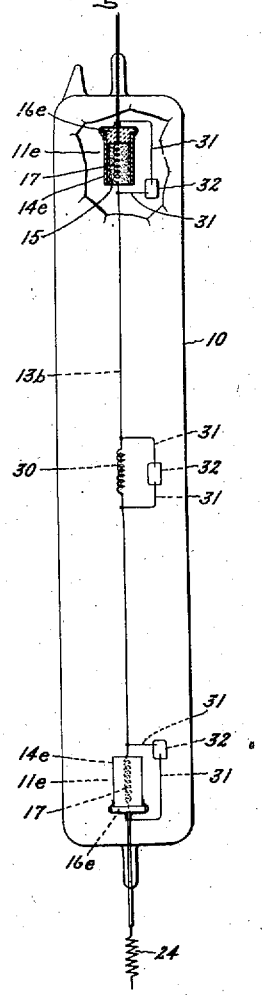

In the device of Fig. 7, a coiled wire or filamentary resistance 30 (as of tungsten or molybdenum) is interposed in the lead 13*b*, preferably at mid-length in the main discharge gap, to take any excess of voltage between the electrodes 11*e*, 11*e* as compared with what can safely be taken by the electrode-heating resistance 17, 17. By thus nicely adjusting the voltage drop in the resistances 17, 17, their enclosure as in Figs. 1–6 becomes unnecessary in many cases. Accordingly, the electrodes 11*e*, 11*e* are here shown as of open-ended hollow type, with their open ends toward one another, and internally emissive. While the details of their construction are broadly unessential, each of them is shown as consisting of a (nickel) tube 14*e* internally surfaced or coated with electron-emissive material (barium oxide) 15, and having an insulative refractory (lava) plug 16*e* in one end only. To protect the resistance coils 17, 17 and 30 from any possibility of undue stretching out under tension due to the weight of the parts (particularly the electrodes 11*e*, 11*e*), rigid insulative connections between the leads connected by these coils may be provided, each shown as consisting of wires 31, 31 fused into insulative (glass or alumina) beads 32, and welded to the leads at opposite sides of the coils.

In a sodium or similar metal vapor discharge device, the energy absorbed in the intermediate axial resistance 30 during operation is not wasted, but, on the contrary, tends to improve the overall efficiency of the device,—even when the electrode resistances 17, 17 are not proportioned to produce local discharges to assist in the starting. This the resistance 30 does by heating the walls of the envelope 10 between the electrodes 11*e*, 11*e*, and thus vaporizing condensed sodium that otherwise accumulates in this normally cool mid-region of the device—naturally cool because of the extra heat from the electrodes 11*e*, 11*e* at the ends of the lamp. This obviates forcing the main discharge by a high operating voltage in order to bring the envelope 10 generally up to the temperature (250° C. for sodium) corresponding to the vapor pressure of the working substance for maximum efficiency. But the lower the current density of the glow discharge, on the other hand, the higher its luminous efficiency; and the heat from the resistance 30 gives the envelope temperature required for efficiency with a low current density in the main discharge. Obviously, the heating resistance 30 need not be concentrated in a short length as shown in Fig. 6, but may be extended or stretched out to cover as much as desired of the interval between the electrodes 11*e*, 11*e*,—so as to give as even a temperature as possible between them and throughout the length of the device, and so keep up a higher vapor pressure of sodium in the device. Axially located as shown, the resistance 30 heats the envelope walls evenly all the way around, which is important to assure adequate vapor pressure of sodium for efficient operation.

In a sodium lamp, red light from a filamentary heating resistance 30 operating at suitable low temperature serves to improve the quality of the light, which by itself is too predominantly yellow for many purposes.

If the filamentary resistance 30 is heated to incandescence under the relatively high starting voltage and current through it, or if it is coated with emissive material (like barium oxide), then it may become electron-emissive during starting, and act as a sort of temporary intermediate auxiliary electrode to assist in starting: i. e., the local discharges at the electrodes 11e, 11e may be followed by intermediate discharges between each of these electrodes and the heating filament 30, thus ionizing more gas between the main electrodes and thereby further facilitating starting of the main discharge between them. Such action can be prevented, of course, by making the resistance 30 such as not to reach an incandescent or electron-emissive temperature during starting. Or if the intermediate resistance 30 has to take a voltage somewhat exceeding the ionization potential of the atmosphere in the envelope during operation of the device, local discharge or arcing along this resistance 30 may nevertheless be obviated by insulatively (and refractorily) enclosing it,—provided, of course, the voltage drop in question is not too high.

Figure 8:
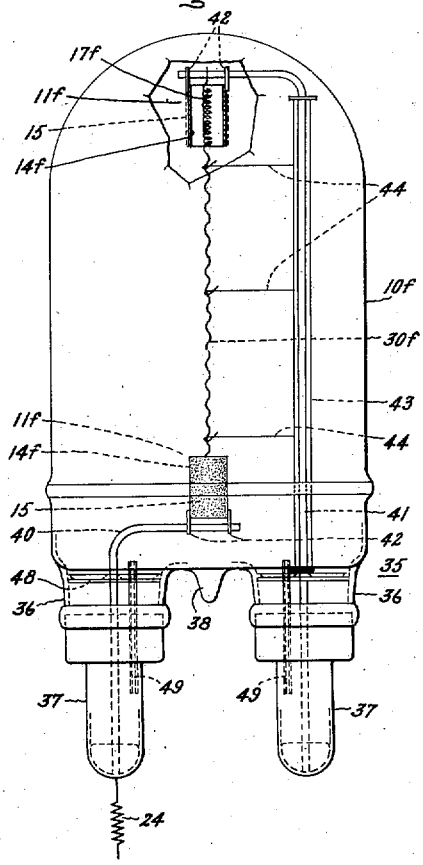

Fig. 8 shows a lamp somewhat similar to that of Fig. 7, but having the intermediate resistance 30f extended over the whole interval between the electrodes 11f, 11f and the heating resistances 17f, 17f. As shown, these resistances 17f, 30f, 17f are all combined in one length of finely coiled wire or filament (tungsten or molybdenum), which is greatly stretched out between the electrodes 11f, 11f, and left concentrated within them. This affords the necessary resistances at the electrodes 11f, 11f to take voltages above the ionization potential of the atmosphere in the device at starting, and thus assure local discharges between each electrode and the adjacent portion (17f or 30f) of the long filament, to assist in starting. The stretching out of the intermediate resistance 30f over a long length minimizes the likelihood of discharges or arcs along it during operation if the voltage drop on it is rather high. The uniform heating of the envelope 10f throughout its length by the electrodes and the filamentary resistance 30f improves the efficiency of a sodium vapor or similar glow discharge device, regardless of whether the resistances 17f, 17f are proportioned to produce local starting discharges or not.

While the details of construction of the device shown in Fig. 8 are not broadly essential, they present features of peculiar novelty and advantage. As here shown, the envelope 10f is cylindrical, with a hemispherical upper end or bowl,—rather than more strictly tubular as in Figs. 1–7,—and is equipped with a unitary base and contact terminal structure 35 of the type commonly known as a "bi-post base." This structure 35 comprises a cup-like (glass) body with downward-projecting hollow nipples 36, 36 to which are fused hollow metal terminal posts or thimble-sleeves 37, 37, closed at their lower ends. The exhaust tip 38 on the glass body 35 is also shown. Metal lead wires 40, 41 are attached to the hollow contact terminals 37, 37 inside the latter, and extend up through the nipples 36, 36 into the cup-like body 35, where the lead 40 is bent to extend radially inward to (and across) the center or axis of the envelope 10f, while the lead 41 extends up near the bowl end of the envelope before being similarly bent. The nickel tube base 14f of each electrode 11f is attached to the corresponding current lead 40 or 41, which extends diametrally across the end of this tube 14f, by (nickel) wires or strips 42, 42, welded to tube and lead. In the present instance, the electrodes 11f, 11f are externally emissive, and their emissive (barium oxide) coatings 15, 15 are on the outside of the tubes 14f, 14f. Both ends of these tubes are open. The lead 41 is shown provided with an insulative (glass or alumina) tubular covering 43, and intermediate anchor supports 44, 44, 44 are fused into this covering 43 and have pigtail loops on their free ends to embrace the filament 30f.

For various reasons, it is desirable to exclude hot sodium vapor or the like from the terminal post structures 37, 37; and for this purpose, a shut-off disc 48 (preferably suitably refractory or thermo-insulative, as well as electrically insulative) is shown in each post-nipple 36, 36, forming a septum across the interior of the nipple. The current lead 40 or 41 (as the case may be) extends through a hole in the disc 48, and this hole and the joint around the disc edge are sealed tight with suitable insulative cement,—which at the lead 41 may also form an insulative joint between the tube 43 and the disc 48. A fine tube 49 extends through the disc 48, to permit the interior of the terminal post 37 to be exhausted through the bulb proper and the tip 38. The opening through the tube 49 is so fine as to be automatically closed or sealed up by sodium or the like condensing in the tube when the device is first operated. Along with their other functions, the shut-offs 48, 48 reduce the loss of heat by transmission via the terminals 37, 37.

Figure 2:
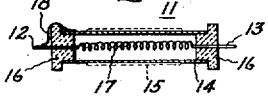
Fig. 2 shows a longitudinal or axial mid-section through one of the electrodes shown in Fig. 1.

In Figs. 3, 4, 5, 6, 7, and 8, various parts and features are marked with the same reference numbers as the corresponding ones in Figs. 1 and 2 (with an added letter, where such distinction appears necessary), as a means of minimizing and avoiding repetitive description. It will be understood that besides the external ballasts 24 shown in Figs. 3–8, any or all of the devices may be operated with such usual sodium vapor lamp accessories as an enclosing vacuum jacket (not shown) and a refractory thermo-insulative asbestos jacket gasket (not shown) to conserve heat. A compensating resistance, reactor, or transformer (as witness Fig. 1) may be used to allow operation of the device on ordinary A. C. lighting circuits of 110 to 120 volts, etc.

What I claim as new and desire to secure by Letters Patent of the United States, is:

1. A positive column electric discharge device comprising an envelope containing an ionizable gaseous atmosphere therein for the starting and operation of the device; widely separated coacting main discharge electrodes in said envelope, one at least thermionic; a discharge circuit for said main electrodes, and a heating circuit for said thermionic electrode having a relatively short discharge gap thereacross in the atmosphere in said envelope; heating means in said heating circuit for said thermionic main electrode; and voltage-controlling means for said heating circuit automatically permitting thereacross a voltage sufficiently exceeding the ionizing potential of the atmosphere in the envelope, during starting, to produce a local discharge across its said gap and thereby ionize the atmosphere and start the main discharge between said electrodes, and thereafter reducing the heating circuit voltage and thus preventing objectionable persistence of such local discharge.

2. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated coacting main discharge electrodes in said envelope, one at least thermionic and provided with electrical heating means; a discharge circuit for said main electrodes, and a heating circuit for said thermionic electrode including said heating means and having a relatively short thermionic discharge gap thereacross in the atmosphere in said envelope; both of said circuits being under the influence of said voltage-controlling means, and said heating circuit taking a voltage sufficiently exceeding the ionization potential of the atmosphere in the envelope, during starting, to produce a local discharge across its said gap and thereby ionize the atmosphere and start the main discharge between said electrodes, and thereafter taking a reduced voltage preventing objectionable persistence of such local discharge.

3. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated coacting main discharge electrodes in said envelope, one at least thermionic and provided with electrical heating means; and a heating circuit in parallel with the discharge gap between said main electrodes and including said heating means, and having a relatively short discharge gap thereacross in the atmosphere in said envelope, in parallel with said heating means; the electrical resistances of said heating means and of the rest of said heating circuit being so proportioned that under the influence of said voltage-controlling means said heating means takes a voltage sufficiently exceeding the ionization potential of the atmosphere in the envelope, during starting, to produce a local discharge across said short gap and thereby ionize the atmosphere and start the main discharge, and thereafter takes a reduced voltage preventing objectionable persistence of such local discharge.

4. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated coacting main discharge electrodes in said envelope, one at least thermionic and unipotential and having electrical heating means; and a heating circuit in parallel with the discharge gap between said main electrodes including said heating means and having a part in such close proximity to the emissive surface of said electrode as to provide a relatively short discharge gap in parallel with said resistance; the electrical resistances of said heating means and of the rest of said heating circuit being so proportioned that under the influence of said voltage-controlling means said heating means takes a voltage sufficiently exceeding the ionization potential of the atmosphere in the envelope, during starting, to produce a local discharge across said short gap and thereby ionize the atmosphere and start the main discharge, and thereafter takes a reduced voltage preventing objectionable persistence of such local discharge.

5. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated coacting, thermionic main discharge electrodes in said envelope having electrical heating means; and a heating circuit in parallel with the discharge gap between said main electrodes including said heating means in series with one another and having relatively short discharge gaps in the atmosphere in said envelope, in parallel with said heating means respectively; the electrical resistances of said heating means being so proportioned to the total resistance of said heating circuit that under the influence of said voltage-controlling means said heating means take voltages sufficiently exceeding the ionization potential of the atmosphere in the envelope, during starting, to produce local discharges across said short gaps and thereby ionize the atmosphere and start the main discharge, and thereafter take reduced voltages preventing objectionable persistence of such local discharges.

6. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated coacting thermionic, unipotential main discharge electrodes in said envelope having electrical heating means; and a heating circuit in parallel with the discharge gap between said main electrodes serially including said heating means and a current lead along through the discharge gap between the electrodes interconnecting the heating means, and also having parts in such close proximity to the emissive surfaces of said electrodes as to provide relatively short discharge gaps in parallel with said heating means, respectively; the electrical resistances of said heating means being so proportioned to the total resistance of said heating circuit that under the influence of said voltage-controlling means said heating means take voltages sufficiently exceeding the ionization potential of the atmosphere in the envelope during starting, to produce local discharges across said short gaps and thereby ionize the atmosphere and start the main discharge, and thereafter take reduced voltages preventing objectionable persistence of such local discharges.

7. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated, coacting, thermionic, unipotential, main discharge supporting electrodes in said envelope having electrical heating means; and a heating circuit in parallel with the discharge gap between said main electrodes serially including said heating means and a current lead along through the discharge gap between the electrodes interconnecting the heating means, and also having projecting anodes in such close proximity to the emissive surfaces of said electrodes as to provide relatively short discharge gaps in parallel with said heating means, respectively; the electrical resistances of said heating means being so proportioned to the total resistance of said heating circuit that under the influence of said voltage-controlling means said heating means take voltages sufficiently exceeding the ionization potential of the atmosphere in the envelope, during starting, to produce local discharges across said short gaps and thereby ionize the atmosphere and start the main discharge, and thereafter take reduced voltages preventing objectionable persistence of such local discharges.

8. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated, coacting, thermionic, unipotential, main discharge supporting electrodes in said envelope having electrical heating means; and a heating circuit in parallel with the discharge gap between said main electrodes serially including said heating means and an insulatively covered current lead along through the discharge gap between the electrode interconnecting the heating means and also having exposed portions in such close proximity to the emissive surfaces of said electrodes as to provide relatively short discharge gaps in parallel with said heating means, respectively; the electrical resistances of said heating means being so proportioned to the total resistance of said heating circuit that under the influence of said voltage-controlling means said heating means take voltages sufficiently exceeding the ionization potential of the atmosphere in the envelope, during starting, to produce local discharges across said short gaps and thereby ionize the atmosphere and start the main discharge, and thereafter take reduced voltages preventing objectionable persistence of such local discharges.

9. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated, coacting, thermionic, unipotential, main discharge supporting electrodes in said envelope having electrical heating means; and a heating circuit in parallel with the discharge gap between said main electrodes serially including said heating means and an insulatively covered current lead along through the discharge gap between the electrodes interconnecting the heating means, and also having exposed anode points in such close proximity to the emissive surfaces of said electrodes as to provide relatively short discharge gaps in parallel with said heating means, respectively, and also at intervals between them; the electrical resistances of said heating means being so proportioned to the total resistance of said heating circuit that under the influence of said voltage-controlling means said heating means take voltages sufficiently exceeding the ionization potential of the atmosphere in the envelope, during starting, to produce local discharges across said short gaps and thereby ionize the atmosphere and start the main discharge, and thereafter take reduced voltages.

10. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated, coacting thermionic, unipotential, main discharge supporting electrodes in said envelope having electrical heating means; and a heating circuit in parallel with the discharge gap between said main electrodes serially including said heating means and a current lead embodying substantial resistance extending along through the discharge gap between the electrodes interconnecting the heating means, and also having parts in such close proximity to the emissive surfaces of said electrodes as to provide relatively short discharge gaps in parallel with said heating means, respectively; said heating means being so proportioned to the total resistance of said heating circuit that under the influence of said voltage-controlling means said heating means take voltages sufficiently exceeding the ionization potential of the atmosphere in the envelope, during starting, to produce local discharges across said short gaps and thereby ionize the atmosphere and start the main discharge, and thereafter take reduced voltages.

11. A positive column electric discharge device for operation in conjunction with voltage-controlling means permitting relatively high starting voltage and assuring reduced operating voltage, said device comprising an envelope containing an ionizable gaseous atmosphere therein for the starting and operation of the device; widely separated, coacting, thermionic, unipotential, main discharge supporting electrodes in said envelope; and a filamentary heating circuit connected in parallel with the discharge gap between said main electrodes and extending along through said discharge gap, and having coiled end portions for heating the electrodes and a relatively uncoiled intermediate portion, and being in such close proximity to the emissive surfaces of said electrodes as to provide relatively short discharge gaps in parallel with said end portions, respectively; the resistances of said coiled end portions being so proportioned to the total resistance of said heating circuit that under the influence of said voltage-controlling means said end portions take voltages sufficiently exceeding the ionization potential of the atmosphere in the envelope, during starting, to produce local discharges across said short gaps and thereby ionize the atmosphere and start the main discharge, and thereafter take reduced voltages preventing objectionable persistence of such local discharges.

12. An electric discharge lamp comprising an envelope, a charge of vaporizable working substance in said envelope producing only a small vapor pressure therein, with a diffuse electric discharge, during operation of the lamp; coacting, thermionic, unipotential, electrodes axially arranged in said envelope and having electrical heating means; and a heating circuit in parallel with the discharge gap between said electrodes serially including the said heating means, with a current lead embodying substantial resistance extending axially of the envelope along through said discharge gap interconnecting said electrodes.

13. An electric discharge lamp comprising an envelope, a charge of vaporizable working substance in said envelope producing only a small vapor pressure therein, with a diffuse electric discharge, during operation of the lamp; coacting, thermionic, unipotential, electrodes axially arranged in said envelope; and a filamentary heater extending axially of the envelope along through the discharge gap between said electrodes, and having coiled end portions for heating the electrodes and a relatively uncoiled intermediate portion for uniformly heating the envelope walls all around it.

14. A positive column gaseous electric discharge device comprising a sealed elongated envelope containing an ionizable gaseous atmosphere, widely separated coacting electrodes in said envelope, at least one of said electrodes being a heatable thermionic electrode so proportioned that the voltage drop thereacross sufficiently exceeds the ionizing potential of the atmosphere in the envelope, during starting, to produce a local discharge thereacross, the length of the gap between said coacting electrodes being materially greater than the length of the path of said local discharge.

15. A gaseous electric discharge device comprising a sealed envelope containing an ionizable atmosphere, widely separated coacting electrodes in said envelope, at least one of said electrodes being a thermionic electrode so proportioned that the voltage drop thereacross is sufficiently high to produce a local discharge, means to supply sufficient electrical energy across said thermionic electrode to first produce the said local discharge, means to supply sufficient electrical energy across the gap between said electrodes to thereafter start the main discharge between said coacting electrodes, and means for effecting cessation of the said local discharge during normal operation of the device.

16. A gaseous electric discharge device comprising a sealed envelope containing an ionizable atmosphere, widely separated coacting electrodes in said envelope, each of said electrodes being a thermionic electrode comprising a resistance so proportioned that the voltage drop thereacross is sufficiently high to produce a local discharge across parts of the electrode, a discharge circuit for normally maintaining a discharge across the gap between said electrodes, and a heating circuit including the resistances and automatically permitting sufficient electrical energy to flow through said resistances to produce the local discharges and thereafter effecting a cessation of the said local discharges during normal operation of the device.

17. A gaseous electric discharge device comprising a sealed envelope containing an ionizable atmosphere, widely separated coacting electrodes in said envelope, at least one of said electrodes being a thermionic electrode comprising a resistance so proportioned that the voltage drop thereacross is sufficiently high to produce a local discharge across parts of the electrode, means to connect said resistance in a heating circuit, and means to connect said electrodes in an operating circuit, said heating circuit being designed to furnish a sufficient potential across said resistance, only during starting of the device, to produce the said local discharge and thereby assist in the starting of the main discharge between said electrodes.

18. A gaseous electric discharge device comprising a sealed envelope containing an ionizable atmosphere, widely separated coacting electrodes in said envelope, each of said electrodes being a thermionic electrode comprising a resistance so proportioned that the voltage drop thereacross is sufficiently high to produce a local discharge across parts of the electrode, means to connect said resistances in a heating circuit in parallel with the discharge gap between said electrodes, and means to connect said electrodes in an operating circuit, said heating circuit being designed to furnish a sufficient potential across said resistances, only during starting of the device, to produce the said local discharges and thereby assist in the starting of the main discharge between said electrodes.

19. A gaseous electric discharge device comprising a sealed envelope containing an ionizable atmosphere, widely separated coacting electrodes in said envelope, each of said electrodes being a thermionic electrode comprising a resistance so proportioned that the voltage drop thereacross is sufficiently high to produce a local discharge across parts of the electrode, a ballast impedance, means to connect one end of each of the electrode resistances across a source of electrical energy with the said ballast impedance in series with the device, and means to connect the other ends of said resistances together to provide a heating circuit through said resistances in parallel with the discharge gap between said electrodes, the said heating circuit and ballast impedance being designed to afford a sufficient flow of electrical energy through said resistances, only during starting of the device, to produce the said local discharges and thereby assist in the starting of the main discharge between said electrodes.

20. A gaseous electric discharge device comprising a sealed envelope containing an ionizable atmosphere, widely separated coacting electrodes in said envelope, each of said electrodes being a thermionic electrode comprising a resistance so proportioned that the voltage drop thereacross is sufficiently high to produce a local discharge across parts of the electrode, means connecting an end of each of said resistances together in a heating circuit in multiple with the arc gap between said electrodes, and connections for connecting the opposite ends of said resistances across a source of electrical energy, the total resistance in said heating circuit being such as to automatically permit, during starting, a voltage across each of said resistances sufficiently high to produce the said local discharge but affording sufficient resistance during normal operation of the device to prevent persistence of such local discharge, the arrangement of the electrodes being such that the heating circuit, including said resistances is shunted by the discharge between said electrodes.

21. A positive column gaseous electric discharge device comprising a sealed elongated envelope containing an ionizable gaseous atmosphere, widely separated coacting electrodes in said envelope, each of said electrodes being a thermionic electrode comprising a resistance member so proportioned that the voltage drop thereacross sufficiently exceeds the ionizing potential of the atmosphere in the envelope, during starting, to produce a local discharge thereacross, said electrodes also each comprising a conductive member electrically connected to one end of the associated resistance member and extending to a point adjacent the opposite end of said resistance member to provide a short local arc gap adjacent the said opposite end of the resistance member, the length of the gap between said coacting electrodes being materially greater than the length of the path of said local discharge.

GEORGE E. INMAN.